Feb. 20, 1945.   R. A. SMITH   2,370,084
LIGHT POLARIZER
Filed Nov. 13, 1942

Robert A. Smith
INVENTOR.
BY Donald L. Brown
Attorney

Patented Feb. 20, 1945

2,370,084

UNITED STATES PATENT OFFICE 2,370,084

LIGHT POLARIZER

Robert A. Smith, Mahwah, N. J., assignor to Polaroid Corporation, Cambridge, Mass., a corporation of Delaware Application November 13, 1942, Serial No. 465,434

7 Claims. (Cl. 88—65)

This invention relates to light polarizers, and more particularly to devices which polarize light by reflection.

It is one object of the present invention to provide a light-polarizing lens or the like which derives its polarizing power from a multiplicity of light-reflecting surfaces integrally formed therewith.

Another object is to provide a polarizer of the above type which will be particularly resistant to destruction as a result of moisture, heat and light, and which is accordingly particularly adapted for incorporation in or use with an automobile headlight.

A further object is to provide a light-polarizing unit of the above type which particularly lends itself to manufacture in quantity at relatively moderate cost.

A still further object is to provide, as a unitary article of manufacture, a headlight lens having integrally formed on the inner side thereof a multiplicity of light-reflecting fins adapted to produce substantially complete polarization of light incident on said lens from the rear and transmitted thereby.

Other objects and advantages will in part appear and in part be pointed out in the course of the following description of one embodiment of the invention, which is given as a non-limiting example, in connection with the accompanying drawing, in which.

When ordinary, unpolarized light is incident upon an opaque surface, a portion thereof is polarized by reflection therefrom to vibrate in a plane parallel to said surface. The reflected percentage of polarization is a function of the angle of incidence, of the wave-length of the light and of the material of the surface. Successive reflections of a beam may cause it to be more and more completely polarized. For example, if after one reflection the beam is still 25 percent unpolarized, it will be only 6¼ percent unpolarized after two reflections, i. e., it would be over 93 percent polarized, provided that the surfaces at the successive points of reflection are properly oriented, as it is possible for a beam of plane polarized light to lose some of that characteristic when reflected at a surface which is neither parallel nor perpendicular to its direction of vibration.

In order to bring about a sufficient degree of polarization of a given beam of light, it will be seen that all rays therein should be polarized to vibrate in the same direction. In order to produce this result, they should all have similar angles of incidence on the reflecting surface, which in turn requires that the latter be flat and smooth. As a general rule, it may be stated that maximum polarization by reflection is obtained with an angle of incidence having a tangent equal to the index of refraction of the reflecting surface.

Figure 1:
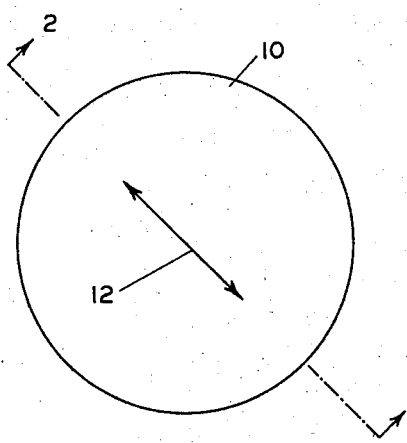
Figure 1 is a front view of a headlight lens constituting an embodiment of the invention.
Figure 2:
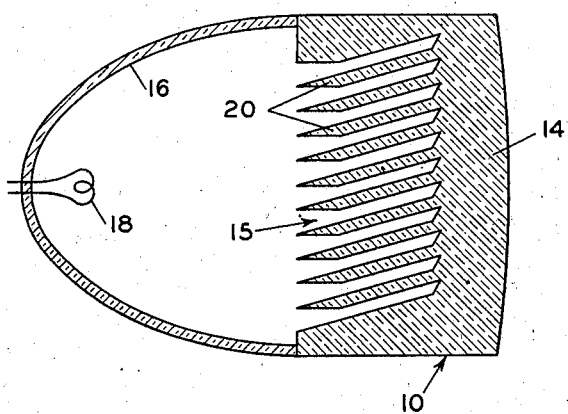
Fig. 2 is a section taken on the line 2—2 in Fig. 1.

One field in which the use of polarized light has been frequently suggested is that of automobile headlighting. It has been proposed, for example, to provide all automobiles with headlights adapted to emit polarized light vibrating at 45 degrees to the horizontal, and to provide each car also with similarly oriented polarizing visors or analyzers. Such a system is disclosed, for example, in the patent to Chubb, No. 2,087,795. Fig. 1 of the accompanying drawing shows a front view of a headlight constructed in accordance with the present invention and adapted for use in a system of automobile headlighting such as that disclosed in said Chubb patent. That is to say, lens 10 in Fig. 1 is adapted to emit polarized light vibrating substantially parallel to arrow 12, namely, at an angle of substantially 45 degrees to the horizontal. As is shown more clearly in Fig. 2, element 10, which may be formed from glass or any other suitable transparent plastic, comprises a front or lens portion 14 and a rear or polarizing portion 15, and the remainder of the headlight may comprise a conventional reflector of metal or metal-coated glass 16, and a filament or other light source 18.

Figure 3:
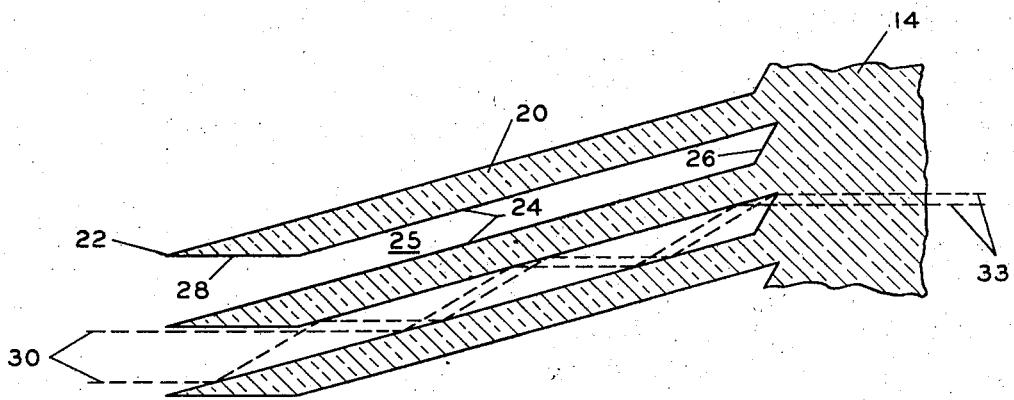
Fig. 3 is an enlarged, detailed view of a portion of Fig. 2.

The construction and operation of polarizing portion 15 of lens 10 is shown more clearly in Fig. 3. Polarizing portion 15 comprises a multiplicity of vanes 20 formed with sharp edges 22 and with their surfaces 24 coated with reflecting material, such for example as chromium or other suitable metal which has preferably been highly polished so as to eliminate all minute cracks, protrusions and depressions and thus provide as smooth surfaces as possible. Vanes 20 are separated by spaces 25, and surfaces 26 at the inner ends of said spaces are preferably light-transmitting. Vanes 20 are preferably tapered because such shape facilitates drawing them from a mold, and it also insures that after the first reflection substantially every ray will fall for its second reflection on the tapered surfaces 24 rather than on beveled surfaces 28 produced in the formation of sharp edges 22. Such edges are an advantage in that they give a negligible absorption or reflection face in the direction of the incident light.

The operation of polarizing portion 15 of lens 10 is shown more clearly by diagram of rays 30 in Fig. 3. It will be noted that said rays are each reflected at least four times from surfaces 24, and are then propagated in a direction parallel to their original direction as polarized rays 33. Since their direction of vibration will be parallel to surfaces 24, the resulting beam will vibrate parallel to arrow 12 in Fig. 1, namely, at 45 degrees to the horizontal. The enlarged view in Fig. 3 shows also more clearly the advantage of having vanes 20 formed with the sharp inner edges 22 in order to cut down loss of light by absorption or reflection.

The combined lens and polarizer of the invention, as exemplified by element 10, may be made relatively easily in great quantity by molding or otherwise shaping the lens and vanes integrally from glass or any suitable transparent plastic. Surfaces 24 may be provided with the desired metal coating by evaporating, sputtering, or any other suitable technique. The resulting lens element is especially adaptable to being made an integral part of an automobile headlamp, combining as it does a polarizer and lens. It is particularly useful where it is desired that the front member of the headlamp be hermetically sealed to the reflector, as in the Sealed Beam type of headlamp, since it may be constructed of comparatively stable and non-volatile materials which are not affected by the high heat used in fusing the lamp elements, or the action of exhausting or rarefying the atmosphere within the lens.

Among the metals particularly possessing the property of polarizing light in a comparatively high degree by multiple reflection may be mentioned, for example, iron, nickel, tungsten, and particularly chromium. When suitable surfaces of highly polished chromium are prepared and arranged so that rays of light are several times reflected at suitable angles, as for example an angle of incidence of 70 degrees, two such reflections are sufficient to give adequate polarization for many purposes, whereas four such reflections give a degree of polarization sufficient for almost any purpose. Fewer or more reflections may be used to obtain less or greater polarization.

Since certain changes may be made in the above device, and different embodiments of the invention could be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A light polarizer comprising a lens of transparent material having a plurality of substantially parallel vanes of appreciable thickness formed integrally therewith and of the same material, said vanes extending from one face of said lens and being disposed obliquely with respect to the axis thereof, said vanes providing a plurality of substantially parallel, smooth, light-reflecting surfaces adapted to substantially polarize, by multiple reflection, a collimated light beam incident thereon at a predetermined angle.

2. A light polarizer comprising a lens of transparent material having a plurality of substantially parallel vanes of appreciable thickness formed integrally therewith and of the same material, said vanes extending from one face of said lens and being disposed obliquely with respect to the axis thereof, said vanes tapering in thickness as they extend from said face, said vanes providing a plurality of substantially parallel, smooth, light-reflecting surfaces adapted to substantially polarize, by multiple reflection, a collimated light beam incident thereon at a predetermined angle.

3. A light polarizer comprising a lens of transparent material having a plurality of substantially parallel vanes of appreciable thickness formed integrally therewith and of the same material, said vanes extending from one face of said lens and being disposed obliquely with respect to the axis thereof, said vanes providing a plurality of substantially parallel, smooth, light-reflecting surfaces adapted to substantially polarize, by multiple reflection, a collimated light beam incident thereon at a predetermined angle, the outer edges of said vanes being so shaped as to provide surfaces forming angles with said light-reflecting surfaces substantially equal to said predetermined angle of incidence.

4. A light polarizer comprising a lens of transparent material having a plurality of substantially parallel vanes of appreciable thickness formed integrally therewith and of the same material, said vanes extending from one face of said lens and being disposed obliquely with respect to the axis thereof, said vanes providing a plurality of substantially parallel, smooth, light-reflecting surfaces adapted to substantially polarize, by multiple reflection, a collimated light beam incident thereon at a predetermined angle, said surfaces being coated with chromium.

5. A headlight for automotive vehicles and the like, adapted to emit polarized light, comprising a light source, a reflector for substantially collimating light emanating from said source, and a lens interposed in the path of said collimated beam, said lens having extending from its inner face a plurality of substantially parallel vanes formed integrally therewith and of the same material, said vanes being disposed obliquely with respect to the axis of said lens and providing a plurality of light-reflecting, substantially parallel surfaces positioned to intercept said collimated beam at substantially the angle of maximum polarization for light reflected from said surfaces of said vanes, said vanes being of such length that said beam is reflected from the surfaces thereof more than twice.

6. A headlight for automotive vehicles and the like, adapted to emit polarized light, comprising a light source, a reflector for substantially collimating light emanating from said source, and a lens interposed in the path of said collimated beam, said lens having extending from its inner face a plurality of substantially parallel vanes formed integrally therewith and of the same material, said vanes being disposed obliquely with respect to the axis of said lens and providing a plurality of light-reflecting, substantially parallel surfaces positioned to intercept said collimated beam at substantially the angle of maximum polarization for light reflected from said surfaces of said vanes, said vanes being of such length that said beam is reflected from the surfaces thereof more than twice, the light-reflecting surfaces of said vanes comprising substantially optically smooth metallic films.

7. A headlight for automotive vehicles and the like, adapted to emit polarized light, comprising a light source, a reflector for substantially collimating light emanating from said source, and a lens forming with said reflector a housing for said source, said lens having extending from its inner face a plurality of substantially parallel vanes formed integrally therewith and of the same material, said vanes being obliquely disposed with respect to the axis of said lens and being provided with substantially parallel, light-reflecting, smooth, metallic surfaces of such length and so positioned as to substantially polarize said collimated light beam by multiple reflection thereof.

ROBERT A. SMITH.